US012717507B2

(12) United States Patent
Li et al.

(10) Patent No.: US 12,717,507 B2
(45) Date of Patent: Aug. 25, 2026

(54) DATA WRITE METHOD AND RELATED DEVICE

(71) Applicant: Huawei Technologies Co., Ltd., Shenzhen (CN)

(72) Inventors: Jinsong Li, Chengdu (CN); Jun Gao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/640,799

(22) Filed: Apr. 19, 2024

(65) Prior Publication Data

US 2024/0264762 A1 Aug. 8, 2024

Related U.S. Application Data

(63) Continuation of application No. PCT/CN2022/093193, filed on May 17, 2022.

(30) Foreign Application Priority Data

Oct. 21, 2021 (CN) ........................ 202111228801.X

(51) Int. Cl.
*G06F 3/06* (2006.01)

(52) U.S. Cl.
CPC .......... *G06F 3/0647* (2013.01); *G06F 3/0604* (2013.01); *G06F 3/0644* (2013.01); *G06F 3/0689* (2013.01)

(58) Field of Classification Search
CPC .... G06F 3/0647; G06F 3/0604; G06F 3/0644; G06F 3/0689
See application file for complete search history.

(56) References Cited

U.S. PATENT DOCUMENTS

| | | | | |
|---|---|---|---|---|
| 9,747,202 | B1 * | 8/2017 | Shaharabany | G06F 12/0246 |
| 2016/0011971 | A1 * | 1/2016 | Lee | G06F 12/0246 711/103 |
| 2018/0165189 | A1 * | 6/2018 | Tai | G06F 3/064 |
| 2018/0357160 | A1 * | 12/2018 | Gorobets | G06F 3/064 |
| 2021/0200454 | A1 | 7/2021 | Kim et al. | |
| 2022/0391088 | A1 * | 12/2022 | Malshe | G06F 3/0619 |

FOREIGN PATENT DOCUMENTS

| | | | |
|---|---|---|---|
| CN | 109542358 A | * | 3/2019 |
| CN | 110674056 A | | 1/2020 |
| CN | 111045598 A | | 4/2020 |

OTHER PUBLICATIONS

Prepressure, Raid, Dec. 9, 2020, Available at: https://web.archive.org/web/20201209034707/https://www.prepressure.com/library/technology/raid (Year: 2020).*

* cited by examiner

*Primary Examiner* — Ryan Bertram

(74) *Attorney, Agent, or Firm* — Conley Rose, P.C.

(57) ABSTRACT

A data write method includes: obtaining a first logical address of first data; determining whether second data is stored in a storage pool, where a logical address of the second data is the same as the first logical address; and when the second data is stored in the storage pool, writing the first data to a first logical block set of the storage pool, where the first logical block set is used for storing hot data.

20 Claims, 6 Drawing Sheets

Write first data

Hotspot statistics module

Update a bitmap

Does second data exists?

No

Yes

Write to a first logical block set

Write to a second logical block set 800
801
Processing unit

DATA WRITE METHOD AND RELATED DEVICE

CROSS-REFERENCE TO RELATED APPLICATIONS

This is a continuation of International Patent Application No. PCT/CN2022/093193 filed on May 17, 2022, which claims priority to Chinese Patent Application No. 202111228801.X filed on Oct. 21, 2021. The disclosures of the aforementioned applications are hereby incorporated by reference in their entireties.

TECHNICAL FIELD

This disclosure relates to the computer field, and in particular, to a data write method and a related device.

BACKGROUND

An abstract storage pool may be created based on a storage device, where the storage pool includes a plurality of logical block groups. When data is written to the storage pool, if a logical address of the written data is the same as a logical address of a specific piece of target data that has existed in the storage pool, this is a repeated write. The repeatedly written data does not overwrite the target data, but is written to another location in the storage pool, and the target data is marked as junk data. When a quantity of repeated writes is excessively large, a large amount of space in the storage pool is consumed. To avoid this situation, garbage collection (GC) needs to be performed. Data other than the junk data in a logical block group is migrated to a new logical block group, and all data in the original logical block group is released.

The GC is usually performed when a service of a system is idle. However, in this solution, an amount of migrated data is large. In addition, if no service of the system is idle, performing the GC affects a current service.

SUMMARY

Embodiments of this disclosure provide a data write method and a related device, to reduce read/write amplification during garbage collection.

According to a first aspect, an embodiment of this disclosure provides a data write method.

Each piece of data in a storage pool has a corresponding logical address. Before first data is written to the storage pool, a first logical address in which the first data is written to the storage pool is obtained. Then, it is determined whether second data is stored in the storage pool, where a logical address of the second data is the same as the first logical address. If the second data is stored in the storage pool, the first data is written to a first logical block set of the storage pool, where the first logical block set is used for storing hot data.

In this embodiment of this disclosure, data written to the first logical block set is repeatedly written data, that is, updated data. Because there is a correspondence between a data attribute and a logical address of the data, and when data of a specific attribute needs to be updated, a probability that the data of this attribute continues to be updated subsequently is high. As a result, a proportion of junk data generated in the first logical block set is high, and read/write amplification generated during garbage collection is small.

In a possible implementation, if no second data is stored in the storage pool, writing the first data to a second logical block set of the storage pool, where the second logical block set is used for storing cold data.

In this embodiment of this disclosure, data written to the second logical block set is not repeatedly written data. Therefore, a proportion of junk data generated in the second logical block set is low, so that read/write amplification generated during garbage collection is small.

In a possible implementation, if the proportion of junk data in the first logical block set is greater than or equal to a preset threshold, the first data is migrated to a newly created logical block set, and the data in the first logical block set is released.

In a possible implementation, the first data and the second data have a same data attribute, and there is a correspondence between the first logical address and the data attribute.

In a possible implementation, the storage pool further needs to be created. The storage pool includes a plurality of logical blocks, and storage space of the logical blocks is from a hard disk drive.

According to a second aspect, an embodiment of this disclosure provides a storage device.

The storage device includes a plurality of functional modules. The plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided based on a specific implementation.

According to a third aspect, an embodiment of this disclosure provides a storage device.

The storage device includes a processor, where the processor is coupled to a memory, the memory is configured to store instructions, and when the instructions are executed by the processor, a display device is enabled to perform the method according to the first aspect.

According to a fourth aspect, an embodiment of this disclosure provides a computer program product, including code. When the code is run on a computer, the computer runs the method according to the first aspect.

According to a fifth aspect, an embodiment of this disclosure provides a computer-readable storage medium, where the computer-readable storage medium stores a computer program or instructions. When the computer program or instructions are executed, the computer program or instructions are stored in the computer-readable storage medium. When the computer program or instructions are executed, a computer is enabled to perform the method according to the first aspect.

DESCRIPTION OF EMBODIMENTS

The following describes embodiments of this disclosure with reference to the accompanying drawings. It is clear that the described embodiments are merely a part of rather than all of embodiments of this disclosure. A person of ordinary skill in the art may learn that with development of technologies and emergence of new scenarios, the technical solutions provided in this disclosure are also applicable to a similar technical problem.

In the specification, claims, and accompanying drawings of this disclosure, the terms "first", "second", and the like are intended to distinguish between similar objects but do not necessarily indicate a specific order or sequence. It should be understood that the data termed in such a way are interchangeable in proper circumstances so that embodiments described herein can be implemented in an order other than the order illustrated or described herein. In addition, the terms "include", "have", and any other variants are intended to cover the non-exclusive inclusion. For example, a process, method, system, product, or device that includes a list of steps or units is not necessarily limited to those expressly listed steps or units, but may include other steps or units not expressly listed or inherent to such the process, method, product, or device.

Embodiments of this disclosure provide a data write method, to reduce an amount of migrated data during garbage collection.

Figure 1:
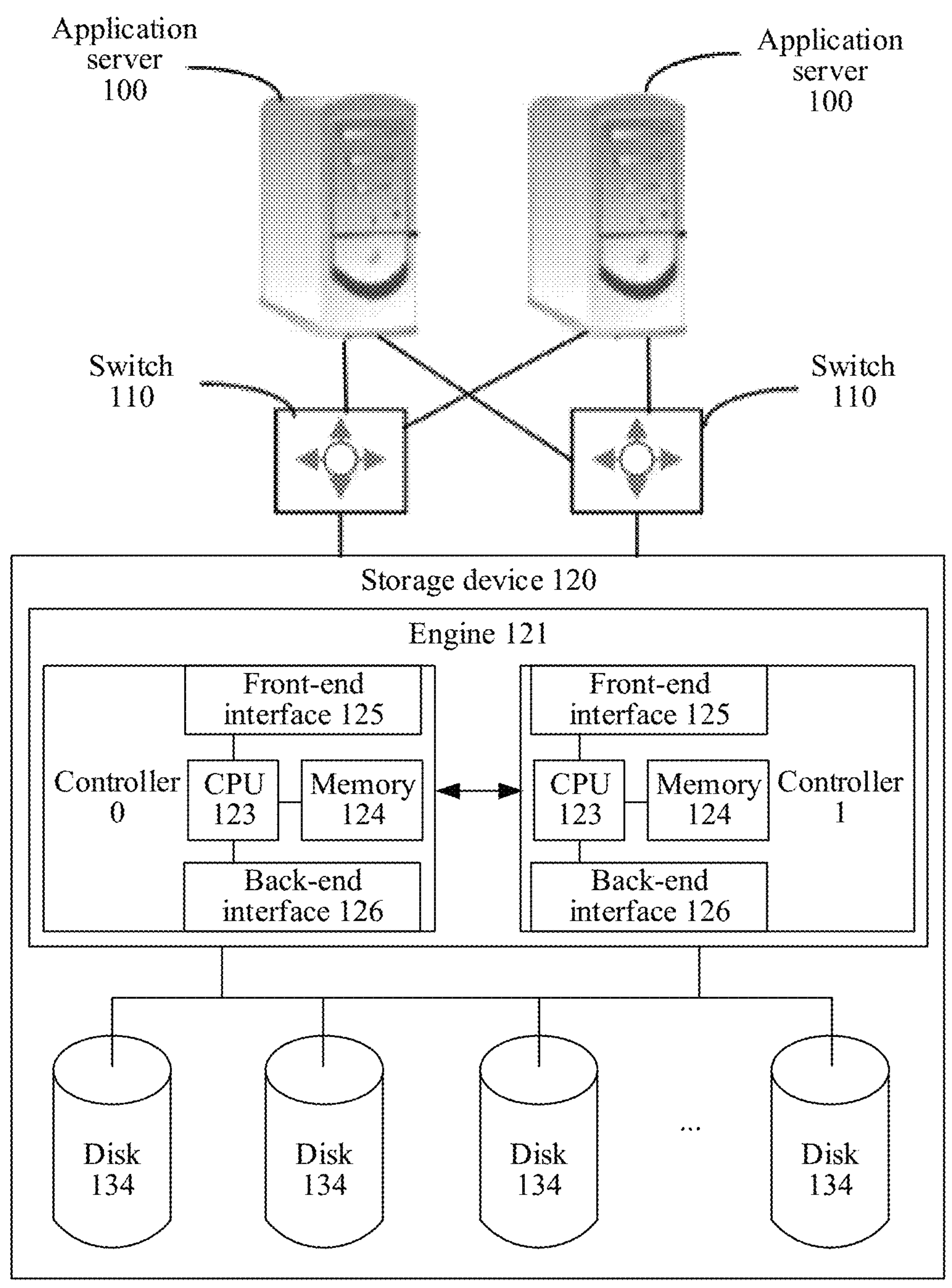
FIG. 1 is a schematic diagram of a system to which a data write method is applied according to an embodiment of this disclosure.

Embodiments of this disclosure may be applied to a system shown in FIG. 1. In the system, a user accesses data by using an application program. A computer that runs the application program is referred to as an "application server". An application server 100 may be a physical machine, or may be a virtual machine. A physical application server includes but is not limited to a desktop computer, a server, a laptop computer, and a mobile device. The application server accesses a storage device 120 by using a fiber channel switch 110, to access the data. However, the switch 110 is merely an optional device, and the application server 100 may also directly communicate with the storage device 120 via a network. Alternatively, the fiber channel switch 110 may be replaced with an Ethernet switch, an INFINIBAND switch, a remote direct memory access (RDMA) RDMA over Converged Ethernet (RoCE) switch, or the like.

The storage device 120 shown in FIG. 1 is a centralized storage system. The centralized storage system features a unified portal, and all data from an external device passes through this portal. The portal is an engine 121 of the centralized storage system. The engine 121 is a most core component of the centralized storage system, and many advanced functions of the storage system are implemented in the engine 121.

As shown in FIG. 1, the engine 121 includes one or more array controllers. An example in which the engine includes two controllers is used for description in FIG. 1. There is a mirror channel between a controller 0 and a controller 1. Therefore, after writing a piece of data to a memory 124 of the controller 0, the controller 0 may send a copy of the data to the controller 1 through the mirror channel, and the controller 1 stores the copy in a local memory 124 of the controller 1. Therefore, the controller 0 and the controller 1 back up each other. When the controller 0 is faulty, the controller 1 may take over a service of the controller 0. When the controller 1 is faulty, the controller 0 may take over a service of the controller 1. This avoids that the entire storage device 120 is unavailable due to a hardware fault. When four controllers are deployed in the engine 121, there is the mirror channel between any two controllers. Therefore, the any two controllers back up each other.

The engine 121 further includes a front-end interface 125 and a back-end interface 126. The front-end interface 125 is configured to communicate with the application server 100, to provide a storage service for the application server 100. The back-end interface 126 is configured to communicate with a disk 134, to expand a capacity of the storage system. The engine 121 may connect to more disks 134 by using the back-end interface 126, to form a large storage pool.

For hardware, as shown in FIG. 1, the controller 0 includes at least a processor 123 and the memory 124. The processor 123 is a central processing unit (CPU) configured to process a data access request from outside the storage system (a server or another storage system) or configured to process a request generated inside the storage system. For example, when receiving, through the front-end interface 125, a data write request sent by the application server 100, the processor 123 temporarily stores, in the memory 124, data in the data write request. When a total amount of data in the memory 124 reaches a specific threshold, the processor 123 sends, through the back-end interface, the data stored in the memory 124 to the disk 134 for performing persistent storage.

The memory 124 is an internal storage that directly exchanges data with the processor. The memory 124 may read/write the data at a fast speed at any time, and serves as a temporary data storage of an operating system or another running program. The memory includes at least two types of storages. For example, the memory may be a random-access memory (RAM) or a read-only memory (ROM). For example, the RAM is a dynamic RAM (DRAM), or a storage class memory (SCM). The DRAM is a semiconductor memory, and is a volatile memory device like most RAMs. The SCM uses a composite storage technology that combines both a conventional storage apparatus feature and a memory feature. The storage class memory can provide a higher read/write speed than the disk, but is slower than the DRAM in terms of an access speed and cheaper than the DRAM in terms of costs. However, the DRAM and the SCM are merely examples for description in this embodiment. The memory may further include another RAM, for example, a static RAM (SRAM). For example, the ROM may be a programmable ROM (PROM) or an erasable PROM (EPROM). In addition, the memory 124 may alternatively be a dual in-line memory module (DIMM), that is, a module including a DRAM, or may be a solid-state drive (SSD). In an actual application, a plurality of memories 124 and the memories 124 with different types may be configured in the controller 0. A quantity of memories 124 and a type of the memory 124 are not limited in this embodiment. In addition, the memory 124 may be configured to have a power failure protection function. The power failure protection function means that the data stored in the memory 124 is not lost even when the system is powered on again after a power failure.

A memory with a power failure protection function is referred to as a non-volatile memory.

The memory 124 stores a software program, and the processor 123 may run the software program in the memory 124 to manage the disk. For example, the disk is abstracted into a storage pool.

A hardware component and a software structure of the controller 1 (and another controller not shown in FIG. 1) are similar to those of the controller 0. Details are not described herein again.

It should be noted that FIG. 1 shows merely one engine 121. However, in actual application, the storage system may include two or more engines 121, and redundancy or load balancing is performed between a plurality of engines 121.

FIG. 1 is the centralized storage system in which a disk and a controller are integrated. In actual implementation, the centralized storage system may alternatively be in a form in which the disk and the controller are separated.

Figure 2:
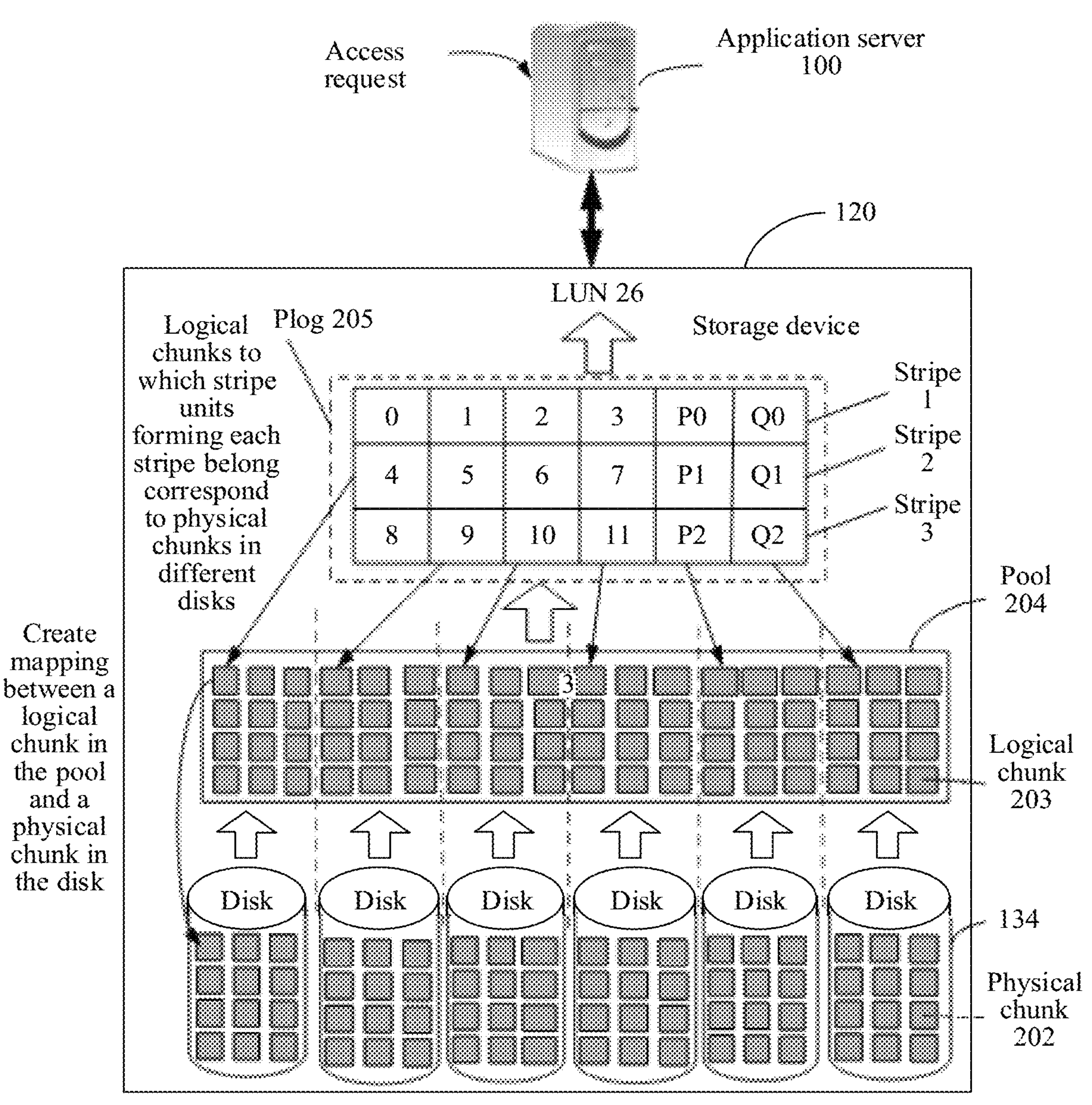
FIG. 2 is a schematic diagram of creating a storage pool according to an embodiment of this disclosure.

FIG. 2 is a schematic diagram of creating a storage pool based on the system shown in FIG. 1. It should be understood that an application server 100 shown in FIG. 2 is similar to the application server 100 shown in FIG. 1, a disk 134 shown in FIG. 2 is similar to the disk 134 shown in FIG. 1, and a storage device 120 shown in FIG. 2 is similar to the storage device 120 shown in FIG. 1. As shown in FIG. 2, the disk 134 in this embodiment of this disclosure may be any type of disk, for example, may be a solid-state drive or a hard disk drive. Each disk 134 is divided into several physical blocks (chucks) 202. The physical blocks 202 are mapped to logical blocks 203, and the logical blocks 203 further form a storage pool 204. The storage pool 204 is configured to provide storage space, and the storage space is actually from the disk 134 included in a system. Certainly, not all disks 134 need to provide space for the storage pool 204. In actual application, the storage system may include one or more storage pools 204, and one storage pool 204 includes some or all of the disks 134. A plurality of logical blocks from different disks or different storage nodes may form a logical block group 205 (plog), and the logical block group 205 is a minimum allocation unit of the storage pool 204.

When a storage service layer applies to the storage pool 204 for the storage space, the storage pool may provide one or more logical block groups for the storage service layer. The storage service layer further virtualizes storage space provided by the logical block group into a logical unit (LU) for use by the application server 100. Each logical unit has a unique logical unit number (LUN) 26. Because the application server 100 can directly sense the logical unit number, a person skilled in the art usually directly uses the LUN to indicate the logical unit. Each LUN has a LUN ID, and the LUN ID identifies the LUN. A specific location of data in one LUN may be determined based on a start address and a length of the data. The start address is usually referred to as a logical block address (LBA) by the person skilled in the art. It may be understood that three factors, namely, the LUN ID, the LBA, and the length, identify a determined address segment. A data access request generated by the application server usually carries the LUN ID, the LBA, and the length.

A quantity of logical blocks in one logical block group depends on a mechanism (or a redundancy mode) used for ensuring data reliability. To ensure the data reliability, the storage system usually uses a multi-copy mechanism or an erasure coding (EC) check mechanism for data storage. In the multi-copy mechanism, at least two identical data copies are stored, and another data copy may be used for restoration when one data copy is lost. If the multi-copy mechanism is used, one logical block group includes at least two logical blocks, and each logical block is located on a different disk 134. In the EC check mechanism, to-be-stored data is divided into at least two data fragments, a check fragment of the at least two data fragments is calculated based on a specific check algorithm. When one data fragment is lost, another data fragment and the check fragment may be used for data restoration. If the EC check mechanism is used, one logical block group includes at least three logical blocks, and each logical block is located on a different disk 134.

The EC check mechanism is used as an example. A plurality of logical blocks from different disks are divided into a data group and a check group based on a specified redundant array of inexpensive disks (RAID) type. The data group includes at least two logical blocks to store the data fragments, and the check group includes at least one logical block for storing the check fragment of the data fragment. When data is aggregated to a specific size in a memory, the data may be divided into a plurality of data fragments based on the specified RAID type, and the check fragment is obtained through calculation. The data fragments and the check fragment are sent to a plurality of different disks for storage in the logical block group. After storage, the data fragments and the check fragment form one stripe. One logical block group may include one or more stripes. Both the data fragment and the check fragment included in the stripe may be referred to as a stripe unit. Logical blocks to which stripe units forming each stripe belong correspond to physical blocks in different disks. In this embodiment, an example in which a size of the stripe unit is 8 kilobytes (kB) is used for description, but the size is not limited to 8 kB. For example, it is assumed that one physical block is selected from each of six hard disk drives to form a logical block set (a subset of the storage pool). Then the logical block set is grouped based on the specified RAID type (where a RAID 6 is used as an example). A chunk 0, a chunk 1, a chunk 2, and a chunk 3 are a data block group, and a chunk 4 and a chunk 5 are a check block group. When an amount of data stored in the memory reaches: 8 kB×4=32 kB, the data is divided into four data fragments (a data fragment 0, a data fragment 1, a data fragment 2, and a data fragment 3), and a size of each data fragment is 8 kB. Then two check fragments (P0 and Q0) are obtained through calculation, and a size of each check fragment is also 8 kB. A processor sends the data fragments and the check fragments to the disk, to store the data in the logical block group. It may be understood that, based on a redundancy protection mechanism of the RAID 6, when any two of the data fragments and the check fragments are invalid, the invalid units may be reconstructed based on remaining fragments of the data fragments and the check fragments.

In addition, before sending the data to the disk, the processor needs to determine whether an allocated logical block group exists. If the allocated logical block group exists, and the logical block group still has sufficient space to accommodate the data, the processor may indicate the disk to write the data to the allocated logical block group. Further, the processor obtains a segment of unused logical addresses from a logical address interval of the allocated logical block group, includes the logical addresses in a data write request, and sends the data write request to the disk.

In the foregoing example, if the processor determines that the allocated logical block group does not exist in the system, or all allocated logical block groups are fully written with data, a new logical block group needs to be created. A creation process of the new logical block group may be that the processor determines, based on a record of available-space of each disk by the processor, that remaining space in the system is sufficient for creating the new logical block group. Next, the processor separately obtains one physical block from different disks, where the physical block is mapped to logical blocks, and then creates these logical blocks into a new logical block group based on the specified RAID type. Each logical block is allocated with a segment of logical addresses, and a set of these logical addresses is logical addresses of the new logical block group. In addition, a mapping relationship between the logical block and the physical block also needs to be stored in the memory, to facilitate search.

To ensure that there is always sufficient available space in the system for creating the logical block group, the processor may monitor available space of each disk in real time or periodically, to learn available space of the entire system. When the available space of the system is smaller than a specified space threshold, garbage collection may be started. For example, a capacity of one hard disk drive is 128 gigabytes (G), a total capacity of all hard disk drives included in the system is 1280 G, and the space threshold may be set to 640 G. In other words, when data stored in the system reaches half of the total capacity, remaining available space also reaches the space threshold. In this case, garbage collection may be performed. It may be understood that 640 G is merely an example of the space threshold, and the space threshold may alternatively be set to another value. In addition, when used space of the system reaches the specified space threshold, the garbage collection may also be triggered. In addition, in another embodiment of the present disclosure, when a data amount of invalid data included in one or more stripes reaches the specified threshold, the garbage collection may also be started. The processor may perform system garbage collection in a unit of a logical block group.

When data is written to the logical block group in the storage pool, a system controller sends, to the disk, a data write request, and the data write request carries a logical address of the data on the disk. When the data is read, the system controller reads the data based on the logical address of the data on the disk.

Figure 3:
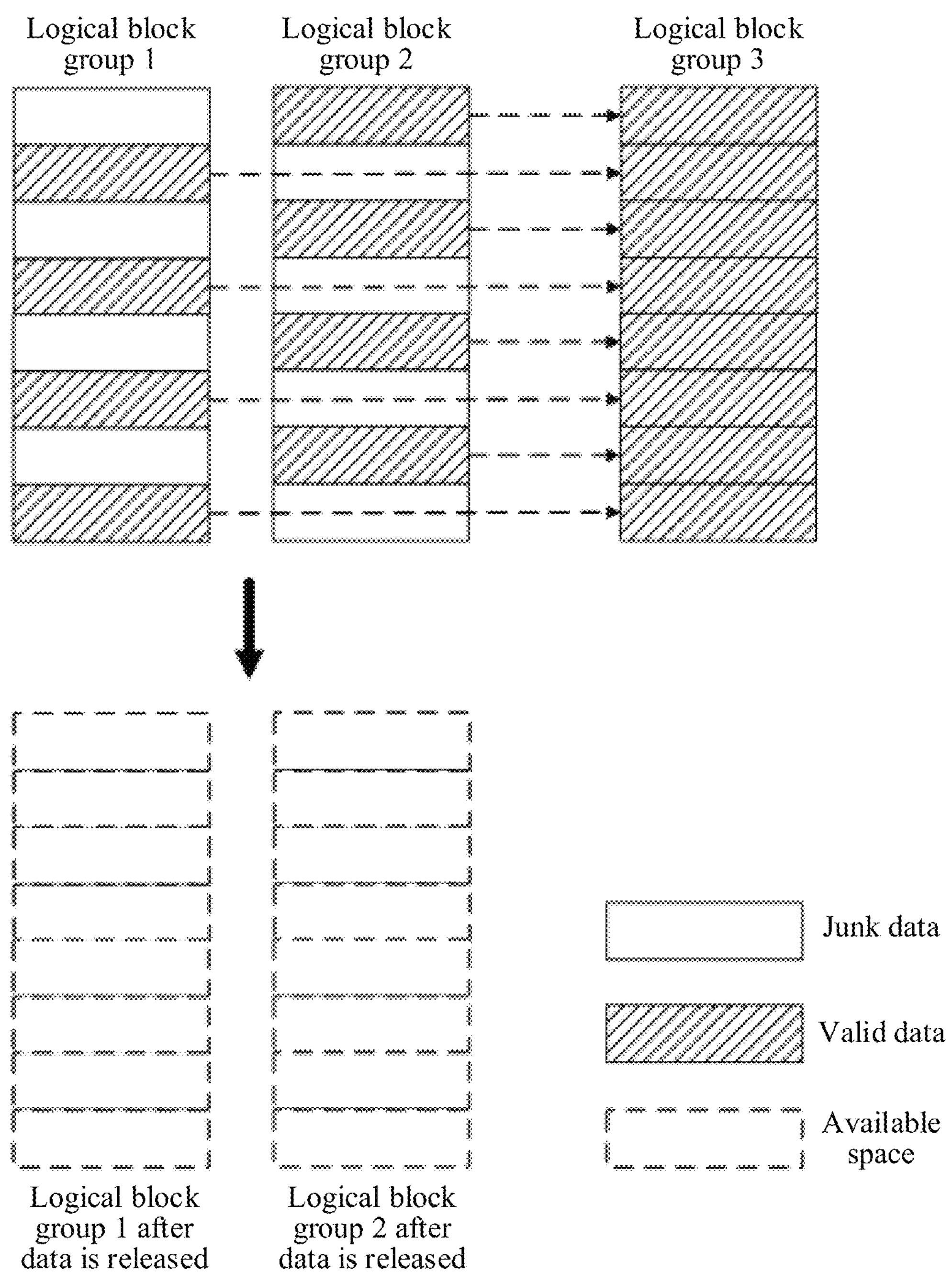
FIG. 3 is a schematic diagram of garbage collection according to an embodiment of this disclosure.

Refer to FIG. 3. The following describes a garbage collection process by using an example.

When data is written, a logical address to which the data is written needs to be determined. The logical address is indicated by using an LBA and a LUN ID. In a data write manner, if data A needs to be written to a logical address 1, where the logical address 1 is indicated by a LUN ID 1 and an LBA 1, if data B exists in a storage pool, and a logical address of the data B is also the logical address 1, the data A does not overwrite the data B. Instead, the data A is written to another location in the storage pool, and the data B is identified as junk data. In this case, the data A is valid data. Certainly, if data C is subsequently written, and a logical address of the data C is also the logical address 1, both the data A and the data B become junk data. In this case, the data C is valid data. Excessive junk data greatly consumes space in the storage pool. To ensure sufficient space in the storage pool, the junk data needs to be collected. It should be understood that this embodiment of this disclosure may be applied to a system in which the foregoing data write manner is used.

For example, a logical block group 1 and a logical block group 2 exist in the storage pool. Because data is randomly written to the logical block group 1 or the logical block group 2, when the written data is converted into junk data, the junk data is also evenly distributed in the logical block group 1 and the logical block group 2. When garbage collection needs to be performed, it is determined whether a proportion of junk data in the logical block group reaches a preset threshold, where the preset threshold may be, for example, 50%. As shown in FIG. 3, both a proportion of junk data in the logical block group 1 and a proportion of junk data in the logical block group 2 reach 50%. Therefore, valid data in the logical block group 1 and valid data in the logical block group 2 need to be migrated to a newly created logical block group 3. Then, data in the logical block group 1 and data in the logical block group 2 are released. In the garbage collection process, read/write amplification is generated. The read/write amplification D meets the following formula (1):

$$D = \frac{\text{Amount of migrated data}}{\text{Amount of released data}} \tag{1}$$

In the garbage collection process shown in FIG. 3, the amount of migrated data is 8, and the amount of released data is 8. Therefore, the read/write amplification generated by the garbage collection shown in FIG. 3 is 1. Larger read/write amplification indicates a larger amount of migrated valid data. This greatly affects a service and a service life of a disk.

Figures 4, 5A:
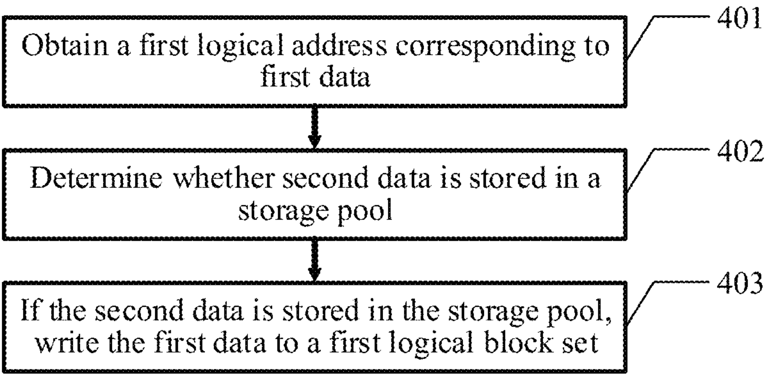
FIG. 4 is a schematic flowchart of a data write method according to an embodiment of this disclosure.
FIG. 5A is a schematic flowchart of writing first data according to an embodiment of this disclosure.

Refer to FIG. 4. The following describes a procedure of a data write method in an embodiment of this disclosure. It should be understood that this embodiment may be applied to the systems shown in FIG. 1 and FIG. 2.

401: Obtain a first logical address of first data.

A system creates a storage pool based on a storage medium. The storage pool includes a plurality of logical blocks, the storage medium may be a hard disk drive, and storage space of the logical blocks is from the hard disk drive. When the system needs to write the first data to the storage pool, the system obtains the first logical address of the first data. The first logical address is carried in a data write request, and the system may obtain the first logical address based on the data write request.

402: Determine whether second data is stored in the storage pool.

After obtaining the first logical address corresponding to the first data, the system determines whether the second data is stored in the storage pool. A logical address of the second data is the first logical address. In a manner, a manner of searching for the second data may be implemented by using a bitmap.

403: If the second data is stored in the storage pool, write the first data to a first logical block set.

There is usually a correspondence between a logical address and a data attribute. For example, in a database system of a bank, data of different attributes may include, for example, an identity card number of a user, a deposit balance of the user, and contact information of the user. A logical address of the data indicating the identity card number of the user is a logical address 1. A logical address of the data indicating the deposit balance of the user is a logical address 2. A logical address of the data indicating the contact information of the user is a logical address 3. Because attributes of data are different, probabilities that data of the attributes changes are also different. In addition, if data of a specific attribute has changed, a probability that the data of the attribute subsequently continues to change is high. If data of a specific attribute has not changed, a probability that the data of the attribute subsequently continues to change is low. For example, the deposit balance of the user usually changes frequently, and the identity card number of the user is usually fixed and unchanged.

On this basis, all logical blocks in the storage pool are classified into the first logical block set and a second logical block set. The first logical block set and the second logical block set each include a plurality of logical blocks. When the first data is written, it is determined, depending on whether the second data exists in the storage pool, to write the first data to the first logical block set or the second logical block set.

Figure 5B:
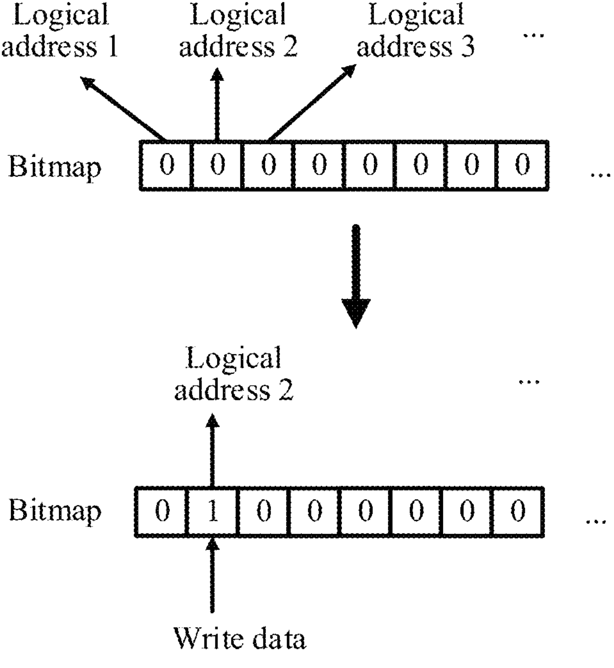
FIG. 5B is a schematic diagram of searching for second data based on a bitmap according to an embodiment of this disclosure.

Refer to FIG. 5A. Determining whether second data exists in a storage pool may be implemented by a hotspot statistics module. For example, refer to FIG. 5B. Each interval in a bitmap represents one logical address. For example, three intervals in the bitmap from left to right respectively represent a logical address 1, a logical address 2, and a logical address 3. When a number in an interval is 0, it indicates that no data is written to a logical address corresponding to the interval. When a number in an interval is 1, it indicates that data has been written to a logical address corresponding to the interval. For example, when a number in an interval representing the logical address 2 is updated from 0 to 1, it indicates that data has been written to the logical address 2 in a storage pool. When first data is written, a hotspot statistics module determines, based on the bitmap, whether second data exists in the storage pool. If a first logical address of the first data is not written before, in other words, no second data exists, after the first data is written, the hotspot statistics module may also modify the bitmap, to identify that the first logical address of the first data has been written.

If the second data exists in the storage pool, because both a logical address of the first data and a logical address of the second data are the first logical address, it indicates that the first data and the second data belong to data of a same attribute. The data of the attribute is updated from the second data to the first data. The second data becomes junk data due to writing of the first data. Therefore, a probability that the first data subsequently becomes junk data is high. For example, both the first data and the second data belong to a deposit balance of a user. After the deposit balance is updated to the first data, a probability that the deposit balance continues to change is high. On this basis, the first data is written to a logical block in a first logical block set.

If no second data is stored in the storage pool, it indicates that a low probability that the first data subsequently becomes junk data is low. For example, the first data is an initially written identity card number of a user, and usually does not change after the first data is written. On this basis, the first data is written to a logical block in a second logical block set.

Based on the foregoing descriptions, it can be learned that the first logical block set is used to store data with a high probability of becoming junk data. The data is also referred to as hot data. The second logical block set is used to store data with a low probability of becoming junk data. The data is referred to as cold data.

Figure 6:
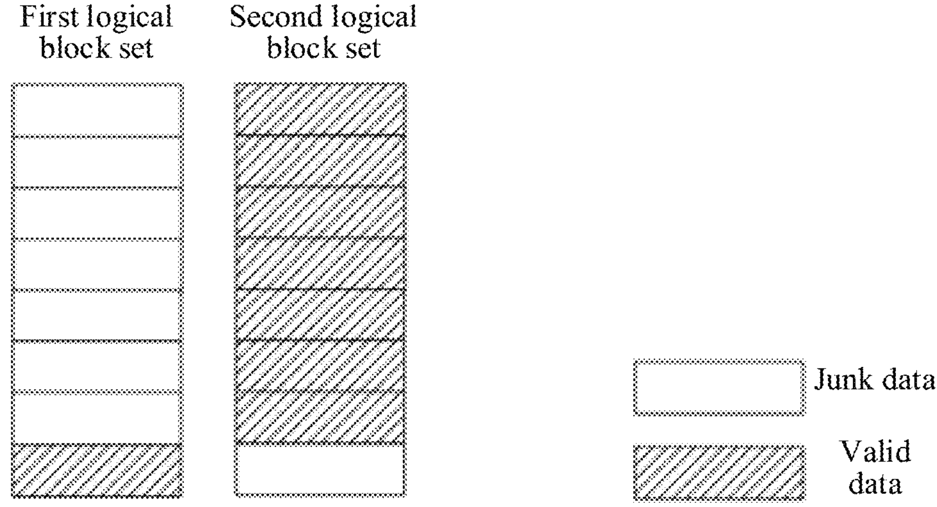
FIG. 6 is a schematic diagram of data distribution in a first logical block set and a second logical block set according to an embodiment of this disclosure.

FIG. 6 is a schematic diagram of data distribution according to an embodiment. As shown in FIG. 6, based on the foregoing data write manner, all data with a high probability of becoming junk data is written to a first logical block set, and all data with a low probability of becoming junk data is written to a second logical block set. Therefore, most of the data in the first logical block set is the junk data, and most of the data in the second logical block set is valid data. It should be understood that in a preferred manner, a storage pool includes two types of logical block groups, where logical blocks in one type of logical block group include logical blocks in the first logical block set, and logical blocks in the other type of logical block group include logical blocks in the second logical block set. Certainly, in actual implementation, it may alternatively be that most of logical blocks in one of the two types of logical block groups include logical blocks in the first logical block set, and a small part of logical blocks include logical blocks in the second logical block set. Most of logical blocks in the other of the two types of logical block groups include logical blocks in the second logical block set, and a small part of logical blocks include logical blocks in the first logical block set.

Figures 7, 8:
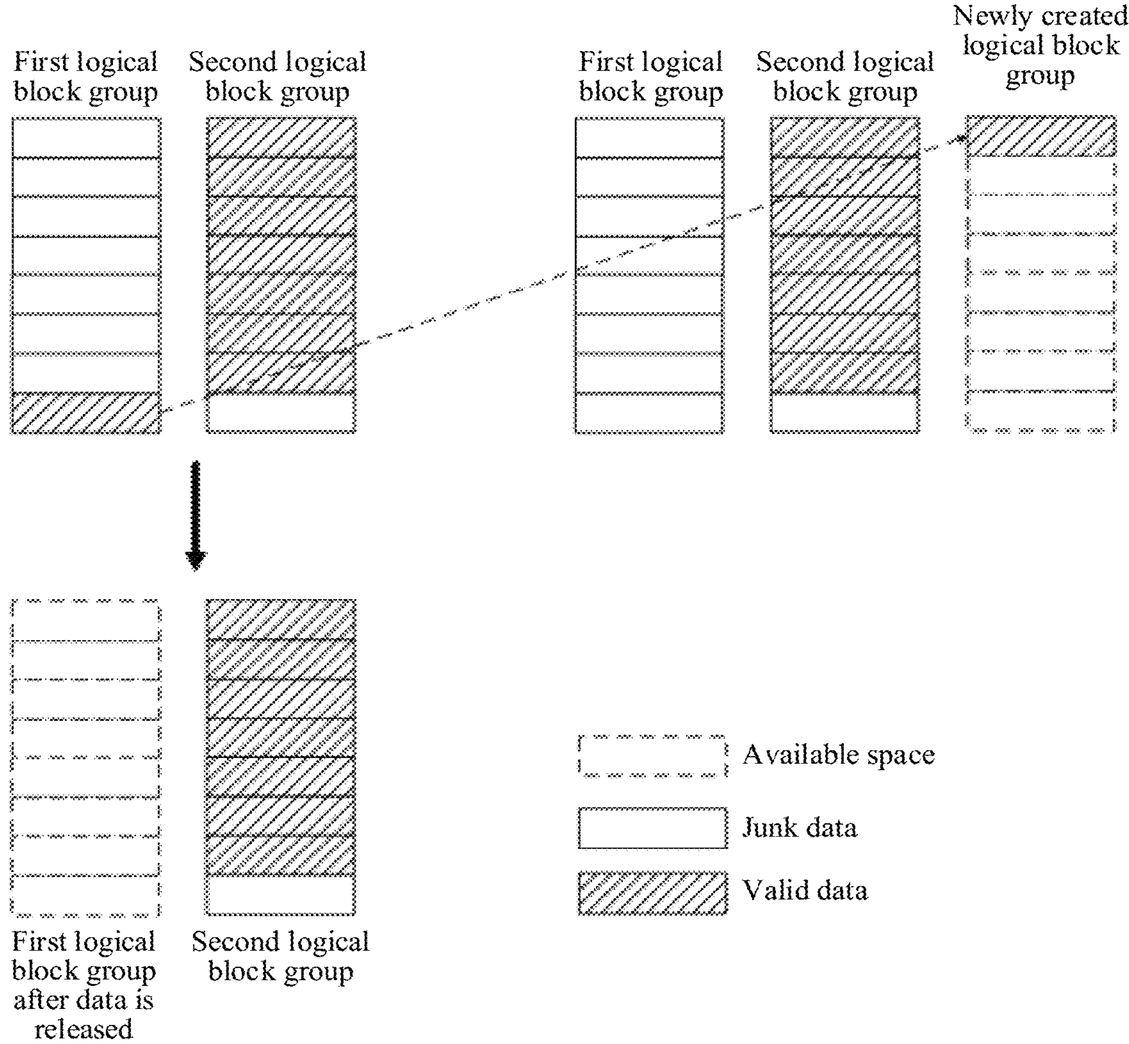
FIG. 7 is another schematic diagram of garbage collection according to an embodiment of this disclosure.
FIG. 8 is a schematic diagram of a structure of a storage device according to an embodiment of this disclosure.

FIG. 7 is another schematic diagram of garbage collection. For example, in actual implementation, some or all of logical blocks in a first logical block set may constitute a first logical block group, and some or all of logical blocks in a second logical block set may constitute a second logical block group. It should be understood that because data in the first logical block group is from data in the first logical block set, junk data in the first logical block group accounts for a high proportion. Because data in the second logical block group is from data in the second logical block set, junk data in the second logical block group accounts for a low proportion. As shown in FIG. 7, a proportion of junk data in the first logical block group reaches 50%. Therefore, valid data in the first logical block group needs to be migrated to a newly created logical block group, and all data in the first logical block group needs to be released. A proportion of junk data in the second logical block group does not reach 50%. Therefore, no processing needs to be performed.

In a garbage collection process shown in FIG. 7, an amount of migrated data is 1, an amount of released data is 7, and it can be learned from the formula (1) that read/write amplification generated by garbage collection is 0.14. It is not difficult to be seen that in this embodiment, because the first logical block group basically includes junk data, and the second logical block group basically includes valid data. Therefore, during garbage collection, merely valid data in a first data block usually needs to be migrated, to greatly reduce read/write amplification.

In this embodiment of this disclosure, junk data aggregation is improved. Therefore, when garbage collection is performed, the amount of migrated data may be reduced, read/write amplification may be reduced, and impact of the garbage collection on a service may be reduced.

The foregoing describes the data write method in embodiments of this disclosure, and the following describes a storage device in embodiments of this disclosure.

Referring to FIG. 8, a storage device 800 in an embodiment of this disclosure includes a processing unit 801.

The processing unit 801 is configured to obtain a first logical address corresponding to first data. The first logical address is indicated by using an LBA and a LUN ID.

The processing unit 801 is further configured to determine whether second data exists in a storage pool. A logical address of the second data is the first logical address.

The processing unit 801 is further configured to, if the second data exists, write the first data to a first logical block set. The first logical block set is used to store hot data.

In a possible implementation, the processing unit 801 is further configured to, if no second data exists, write the first data to a second logical block set. The second logical block set is used to store cold data.

In a possible implementation, the processing unit 801 is further configured to, if a proportion of junk data in the first logical block set is greater than or equal to a preset threshold, migrate the first data to a newly created logical block set.

The processing unit 801 is further configured to release data in the first logical block set.

In a possible implementation, the first data and the second data have a same data attribute, and there is a correspondence between the first logical address and the data attribute.

In a possible implementation, the processing unit 801 is further configured to create the storage pool. The storage pool includes a plurality of logical blocks, and storage space of the logical blocks is from a hard disk drive.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In several embodiments provided in this disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to a conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes any medium that can store program code, for example, a Universal Serial Bus (USB) flash drive, a removable disk, a ROM, a RAM, a magnetic disk, or an optical disc.

What is claimed is:

1. A method comprising:

obtaining a first logical address of first data;

determining whether second data is stored in a storage pool, wherein a second logical address of the second data is the same as the first logical address, wherein there is a correspondence between the first logical address and a data attribute, wherein the first data and the second data share a same data attribute, and wherein the data attribute indicates a type of information associated with a corresponding probability of subsequent update;

determining, when the second logical address of the second data is the same as the first logical address, that the first data and the second data belong to data of the same data attribute;

writing the first data to a first logical block set of the storage pool when the second data is stored in the storage pool, wherein the first logical block set is for storing hot data;

monitoring a proportion of junk data in the first logical block set by determining a ratio of the junk data in the first logical block set;

comparing the proportion of junk data to a threshold value;

migrating the first data to a newly created logical block set when the proportion is greater than or equal to the threshold value; and releasing third data in the first logical block set.

2. The method of claim 1, further comprising:

identifying that the second data is not stored in the storage pool; and writing, in response to identifying that the second data is not stored in the storage pool, the first data to a second logical block set of the storage pool, wherein the second logical block set is for storing cold data.

3. The method of claim 1, wherein the first data and the second data have the same data attribute that corresponds to the first logical address.

4. The method of claim 1, further comprising creating the storage pool, wherein the storage pool comprises logical blocks, and wherein a storage space of the logical blocks is from a hard disk drive.

5. A storage device comprising:

an interface configured to communicate with a host and receive second data; and a processor in communication with the interface and configured to:

obtain a first logical address of first data;

determine whether the second data is stored in a storage pool, wherein a second logical address of the second data is the same as the first logical address, wherein there is a correspondence between the first logical address and a data attribute, wherein the first data and the second data share a same data attribute, and wherein the data attribute indicates a type of information associated with a corresponding probability of subsequent update;

determine, when the second logical address of the second data is the same as the first logical address, that the first data and the second data belong to data of the same data attribute;

write the first data to a first logical block set of the storage pool when the second data is stored in the storage pool, wherein the first logical block set is for storing hot data;

monitor a proportion of junk data in the first logical block set by determining a ratio of the junk data in the first logical block set;

compare the proportion of junk data to a threshold value;

migrate the first data to a newly created logical block set when the proportion is greater than or equal to the threshold value; and release third data in the first logical block set.

6. The storage device of claim 5, wherein the processor is further configured to:

identify that the second data is not stored in the storage pool; and write, in response to identifying that the second data is not stored in the storage pool, the first data to a second logical block set of the storage pool, wherein the second logical block set is for storing cold data.

7. The storage device of claim 5, wherein the processor is further configured to:

migrate the first data to a newly created logical block set when a proportion of junk data in the first logical block set is greater than or equal to a preset threshold; and release data in the first logical block set.

8. The storage device of claim 7, wherein the first data and the second data have the same data attribute that corresponds to the first logical address.

9. The storage device of claim 5, wherein the processor is further configured to create the storage pool, wherein the storage pool comprises logical blocks, and wherein a storage space of the logical blocks is from a hard disk drive.

10. The storage device of claim 5, wherein the processor is further configured to:

obtain a data write request, wherein the first logical address is carried in the data write request; and further obtain, based on the data write request, the first logical address.

11. The storage device of claim 5, wherein the processor is further configured to further determine, based on a bitmap, whether the second data is stored in the storage pool.

12. The method of claim 1, further comprising:

obtaining a data write request, wherein the first logical address is carried in the data write request; and further obtaining, based on the data write request, the first logical address.

13. A computer program product comprising computer-executable instructions that are stored on a non-transitory computer-readable medium and that, when executed by a processor, cause a storage device to:

obtain a first logical address of first data;

determine whether second data is stored in a storage pool, wherein a second logical address of the second data is the same as the first logical address;

write the first data to a first logical block set of the storage pool when the second data is stored in the storage pool, wherein the first logical block set is for storing hot data, wherein there is a correspondence between the first logical address and a data attribute, wherein the first data and the second data share a same data attribute, and wherein the data attribute indicates a type of information associated with a corresponding probability of subsequent update;

determine, when the second logical address of the second data is the same as the first logical address, that the first data and the second data belong to data of the same data attribute;

monitor a proportion of junk data in the first logical block set by determining a ratio of the junk data in the first logical block set;

compare the proportion of junk data to a threshold value;

migrate the first data to a newly created logical block set when the proportion is greater than or equal to the threshold value; and release third data in the first logical block set.

14. The computer program product of claim 13, wherein the computer-executable instructions further cause the storage device to:

identify that the second data is not stored in the storage pool; and write, in response to identifying that the second data is not stored in the storage pool, the first data to a second logical block set of the storage pool, wherein the second logical block set is for storing cold data.

15. The computer program product of claim 13, wherein the computer-executable instructions further cause the storage device to:

migrate the first data to a newly created logical block set when a proportion of junk data in the first logical block set is greater than or equal to a preset threshold; and release third data in the first logical block set.

16. The computer program product of claim 15, wherein the first data and the second data have the same data attribute that corresponds to the first logical address.

17. The computer program product of claim 13, wherein the computer-executable instructions further cause the storage device to create the storage pool, wherein the storage pool comprises logical blocks, and wherein a storage space of the logical blocks is from a hard disk drive.

18. The computer program product of claim 13, wherein the computer-executable instructions further cause the storage device to:

obtain a data write request, wherein the first logical address is carried in the data write request; and further obtain, based on the data write request, the first logical address.

19. The computer program product of claim 13, wherein the computer-executable instructions further cause the storage device to further determine, based on a bitmap, whether the second data is stored in the storage pool.

20. The method of claim 1, wherein the first logical block set comprises logical blocks from different disks for storage divided into a data group and a check group based on a redundant array of inexpensive disks (RAID) type, and wherein writing the first data to the first logical block set comprises:

dividing, when the first data is aggregated to a size in a memory, the first data into a plurality of data fragments based on the RAID type;

obtaining check fragments through calculation based on the data fragments;

sending the data fragments and the check fragments to the different disks; and storing the data fragments and the check fragments across the logical blocks to form one stripe.

* * * * *